(12) United States Patent
Garbelman et al.

(10) Patent No.: US 11,722,386 B2
(45) Date of Patent: Aug. 8, 2023

(54) SMART NETWORK INTERFACE DEVICE

(71) Applicant: CenturyLink Intellectual Property LLC, Broomfield, CO (US)

(72) Inventors: Glenn Garbelman, Tallahassee, FL (US); Kenchen A. Phillips, Calhoun, LA (US); Brian Edward Bond, Fairmont, WV (US); Nathan Edwards, Carrollton, TX (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 17/569,666

(22) Filed: Jan. 6, 2022

(65) Prior Publication Data

US 2022/0272007 A1  Aug. 25, 2022

Related U.S. Application Data

(60) Provisional application No. 63/152,596, filed on Feb. 23, 2021.

(51) Int. Cl.
*G06F 15/16* (2006.01)
*H04L 41/507* (2022.01)
*H04L 43/06* (2022.01)
*H04L 41/0631* (2022.01)
*H04L 43/0823* (2022.01)

(52) U.S. Cl.
CPC ........ *H04L 41/507* (2013.01); *H04L 41/0631* (2013.01); *H04L 43/06* (2013.01); *H04L 43/0823* (2013.01)

(58) Field of Classification Search
CPC . H04L 41/0631; H04L 43/06; H04L 43/0823; H04W 88/08
USPC .......................................................... 709/251
See application file for complete search history.

(56) References Cited

U.S. PATENT DOCUMENTS

| | | | |
|---|---|---|---|
| 11,025,481 B1* | 6/2021 | Louca | H04L 41/069 |
| 2004/0151289 A1* | 8/2004 | Phillips | G08B 27/005 |
| | | | 348/E7.078 |
| 2009/0106406 A1* | 4/2009 | Bernard | H04L 43/50 |
| | | | 709/223 |
| 2014/0108562 A1* | 4/2014 | Panzer | G06Q 10/10 |
| | | | 709/204 |
| 2014/0228129 A1* | 8/2014 | Wang | G06F 8/65 |
| | | | 709/224 |
| 2015/0024742 A1* | 1/2015 | Gupta | H04W 48/16 |
| | | | 455/434 |
| 2015/0026366 A1* | 1/2015 | Altmann | G06F 13/36 |
| | | | 710/14 |
| 2015/0058472 A1* | 2/2015 | Jessee | H04L 51/216 |
| | | | 709/224 |
| 2021/0158431 A1* | 5/2021 | Seitz | H04L 67/306 |
| 2022/0014798 A1* | 1/2022 | Fang | H04N 21/4425 |

* cited by examiner

*Primary Examiner* — Lan Dai T Truong

(57) ABSTRACT

The present application describes a network interface device that acts as an interface between a network service provided by a network service provider and one or more network access devices associated with a particular location and/or entity.

9 Claims, 8 Drawing Sheets

SMART NETWORK INTERFACE DEVICE

CROSS-REFERENCE TO RELATED APPLICATIONS

This application claims the benefit of U.S. Provisional Application No. 63/152,596 filed 23 Feb. 2021, entitled "Metadata-Assisted Inventory Management", which is incorporated herein by reference in its entirety.

BACKGROUND

Hardware devices typically have a short lifespan due to how quickly technology changes. Network access devices, such as routers, network interface device and the like are no different. For example, as Wi-Fi technology changes and evolves, and as new Wi-Fi versions are released, a network access device using the older versions of Wi-Fi may need to be upgraded. However, upgrading different network access devices can be costly.

SUMMARY

The present application describes a network interface device that acts as an interface between a broadband/network access point provided by a network service provider and one or more network access devices associated with a particular location and/or entity. Although the network interface device does not have native wireless network capabilities, the network interface device includes a port to enable the network interface device to be communicatively coupled to one or more wireless network devices. The network interface device also includes a communication system that enables the network interface device to be communicatively coupled to one or more remote computing devices.

Accordingly, the present application describes a network interface device having a first port and a second port. The first port may be used to connect the network interface device to a network access point provided by a network service provider. The second port is used to connect the network interface device a network access device. The network interface device also includes a wireless communication system for communicatively coupling the network interface device to a remote computing device. The wireless communication system may enable the remote computing device to access a subscription service associated with the network service provider and/or enable the remote computing device to access diagnostic information associated with the network interface device. The network interface device also includes a tone generation system. The tone generation system generates a tone for providing additional diagnostic information associated with the network interface device. The tone may be generated in response to instructions received via the wireless communication system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
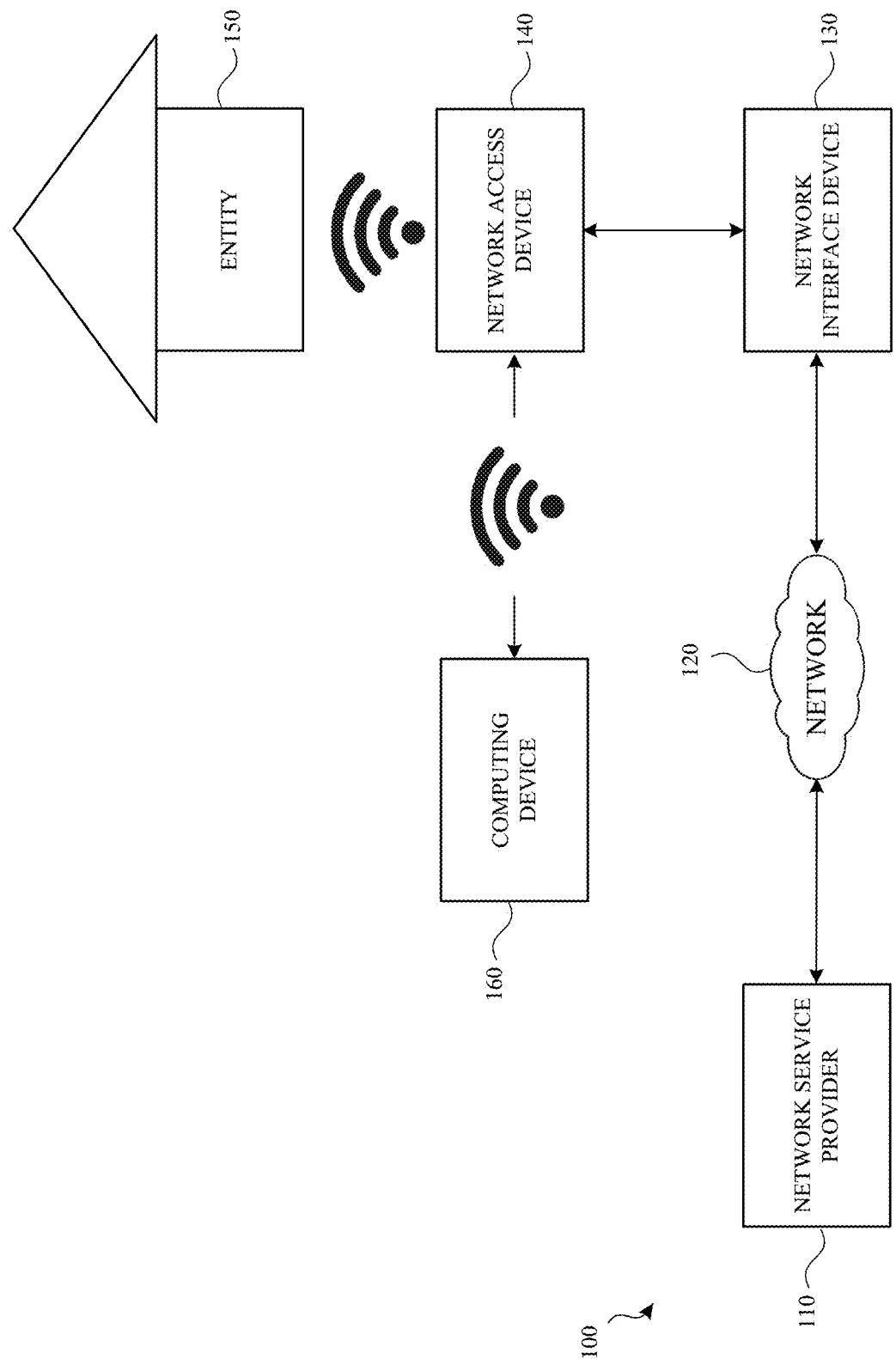
FIG. 1 illustrates an example environment that may include a network interface device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Various computing devices may have relatively short lifespans while other computing devices have relatively longer lifespans. For example, mobile phones may be cutting edge at the time of purchase, but they may be practically obsolete only a few years later. On the other hand, televisions and gaming systems may have comparatively longer lifespans. The same may be true of various network access devices. Some network access devices such as routers, Wi-Fi adapters, mesh network devices and the like may have relatively short lifespans while other network access devices such as network interface devices and modems may have comparatively longer lifespans.

For example, advances in Wi-Fi technology occur approximately every year to two years as different Wi-Fi versions are released. However, updates to WAN/LAN technology (referred to hereinafter as WAN) occur less frequently.

Some network access devices include both Wi-Fi capabilities and WAN capabilities such as modem/router combinations. Since WAN technology has a longer lifespan than Wi-Fi technology, the components that provide Wi-Fi capabilities in these modem/router combinations may become obsolete more quickly than the components that provide WAN capabilities. However, in order to upgrade Wi-Fi capabilities of the network access device, the entire modem/router combination may need to be replaced.

In order to address the above (among other things), the present application describes a network interface device that acts as an interface between a network service provided by a network service provider and one or more network access devices associated with a particular location and/or entity. The network interface device of the present disclosure does not have native Wi-Fi capabilities. However, the network interface device has at least one port through which the network interface device can be communicatively coupled to a wireless network device. In an example, the wireless network device may be a router, a mesh network device and the like.

The network interface device may also include a number of other features and components for convenience of the end user and/or a network technician. For example, the network interface device may include a communication system that enables a computing device (e.g., a mobile phone) associated with the end user to communicatively couple to the network interface device. Once the computing device is communicatively coupled with the network interface device, the end user can order, cancel, and/or change a network subscription from a network service provider.

The communication system may also enable a computing device associated with a network technician to wirelessly communicate with the network interface device. The network technician may, via the communication channel established between the computing device and the network interface device, run various network diagnostic tests to assist the network technician in diagnosing network connectivity issues. In an example, the network technician may send one or more commands to a tone generation system of the network interface device, via the communication channel, which causes the tone generation system to generate a tone to assist the network technician in diagnosing the network connectivity issues.

The network interface device may also include an internal power supply, a cable connection interface, and a diagnostic system that automatically transmits diagnostic information to a network service provider when a potential issue is detected. These and other examples will be explained in more detail below with respect to FIG. 1-FIG. 5.

FIG. 1 illustrates an example environment 100 that may include a network interface device 130 according to an example. The network interface device 130 may be similar to the network interface device shown and described below with respect to FIG. 2-FIG. 3B.

The network interface device 130 may be provided by or otherwise be associated with a network service provider 110. The network service provider 110 may provide network access, via network 120, to the network interface device 130. For example, the network service provider 110 may provide fiber-optic cable, copper cable, and/or other physical links/circuits that enable customers to access the network 120 via the network interface device 130. The network interface device 130 may serve as an interface between the cables/wiring provided by the network service provider and the on-premises wiring of an entity 150. An entity 150 may be a home, a business or other entity for which network access is desired.

Once the network interface device 130 has been coupled to the network 120 (e.g., via a WAN port associated with the network interface device 130), network access may be provided to the entity 150 via a network access device 140. The network access device 140 may be communicatively coupled to the network interface device 130 via an ethernet port provided in the network interface device 130. The network access device 140 may be a mesh network device, a router or other such network device that provides wired and/or wireless network access to one or more computing devices associated with the entity 150. The network access device 140 may also wirelessly communicate with a computing device 160. As will be explained in more detail below, the computing device 160 may be a computing device of a network technician, of a customer of the network service provider or otherwise be associated with the entity 150.

In examples, the network interface device 130 does not have native wireless capabilities but is able to support network access devices 140 that utilize different Wi-Fi versions. For example, the network interface device 130 may be compatible with a network access device 140 that supports Wi-Fi version 5, a network access device 140 that supports Wi-Fi version 6, and/or a network access device 140 that supports Wi-Fi version 7. Although specific Wi-Fi versions are mentioned, these are for example purposes only. In some examples, the network access device 140 may support other wireless communication standards such as, for example, mobile communications and/or LTE.

As discussed above, the network interface device 130 may have a longer lifespan than the network access device 140. As such, even though new versions of Wi-Fi may be available, and even though newer/different network access devices 140 may be communicatively coupled to the network interface device 130, the network interface device 130 can continue to support the new devices and Wi-Fi versions without being upgraded and/or replaced.

Figure 2:
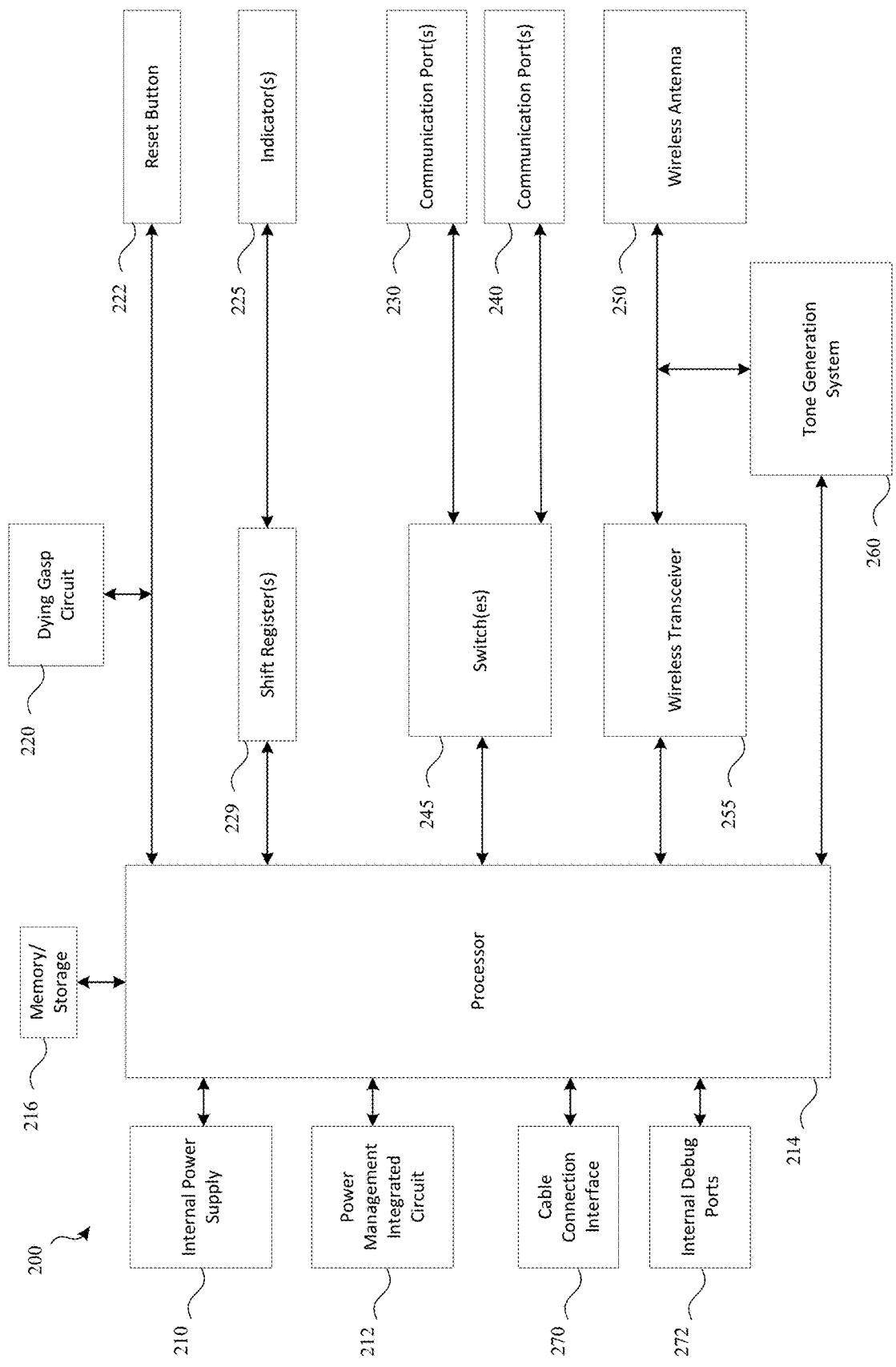
FIG. 2 illustrates components of a network interface device according to an example.

FIG. 2 illustrates components of a network interface device 200 according to an example. The network interface device 200 may be similar to the network interface device 130 shown and described with respect to FIG. 1.

Figure 3A:
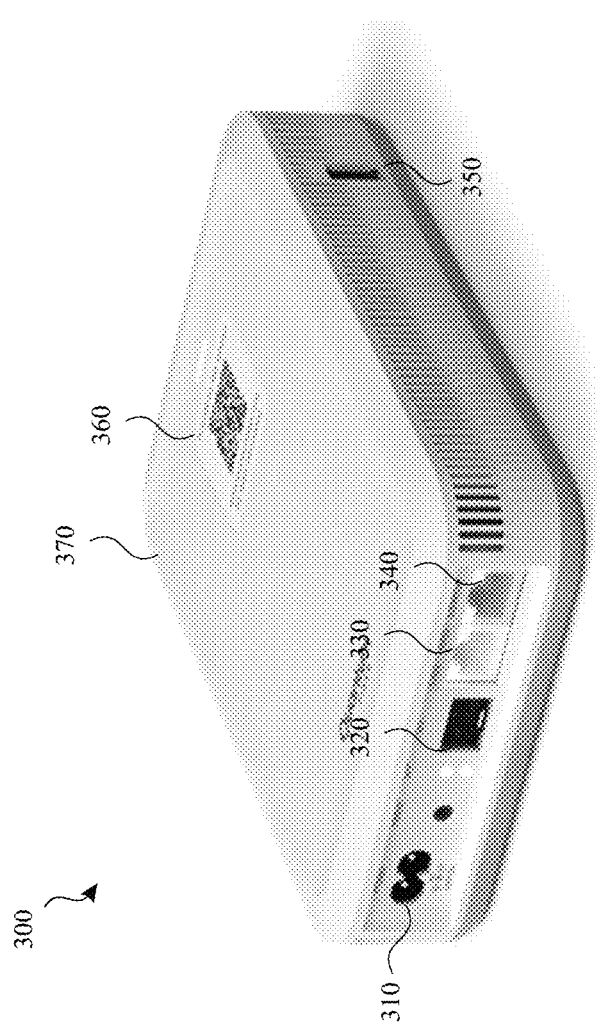
FIG. 3A illustrates an isometric view of a network interface device according to an example.
Figure 3B:
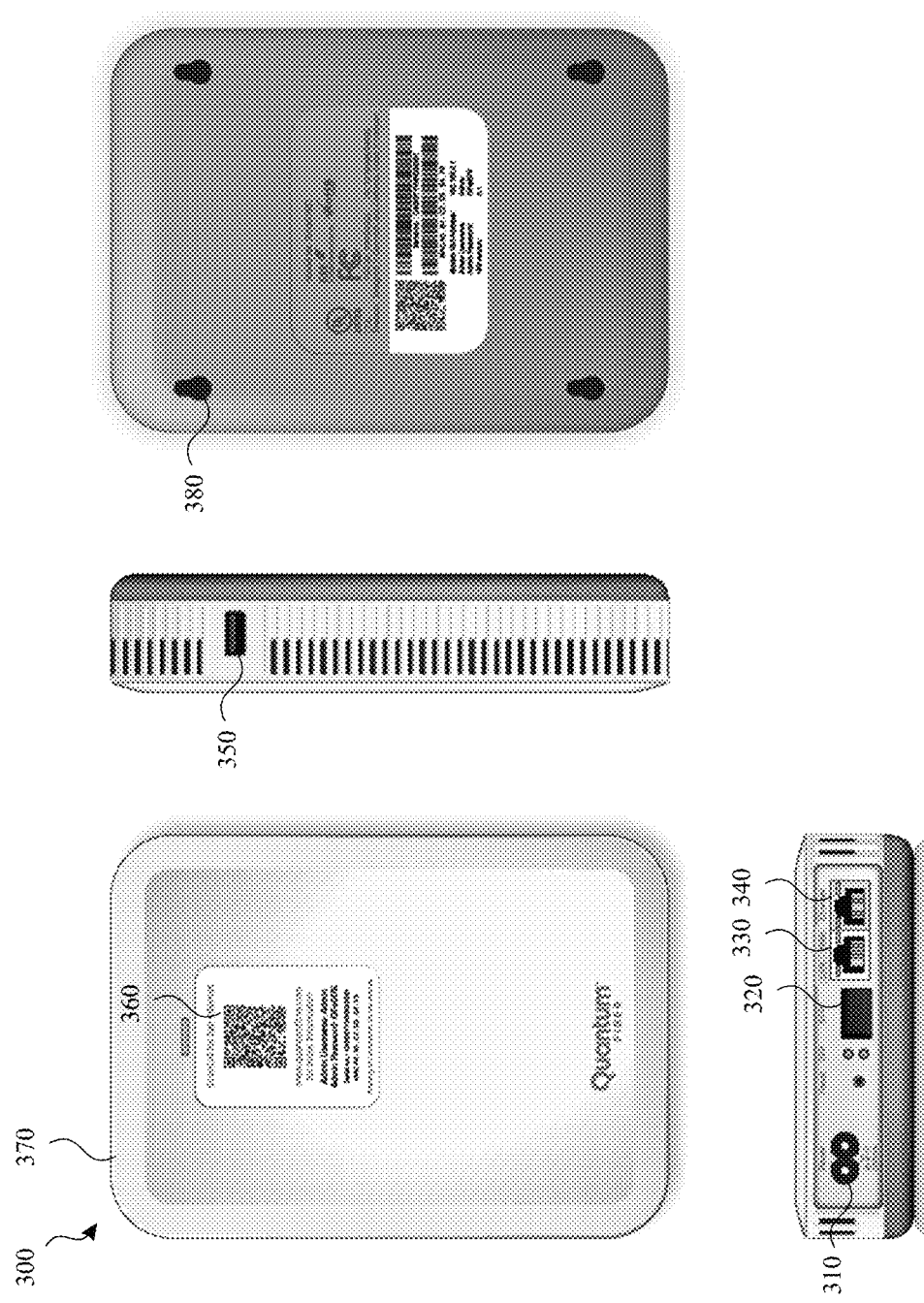
FIG. 3B illustrates a tope view, a side view, a bottom view and a back view of the network interface device of FIG. 3A according to an example.
Figure 3C:
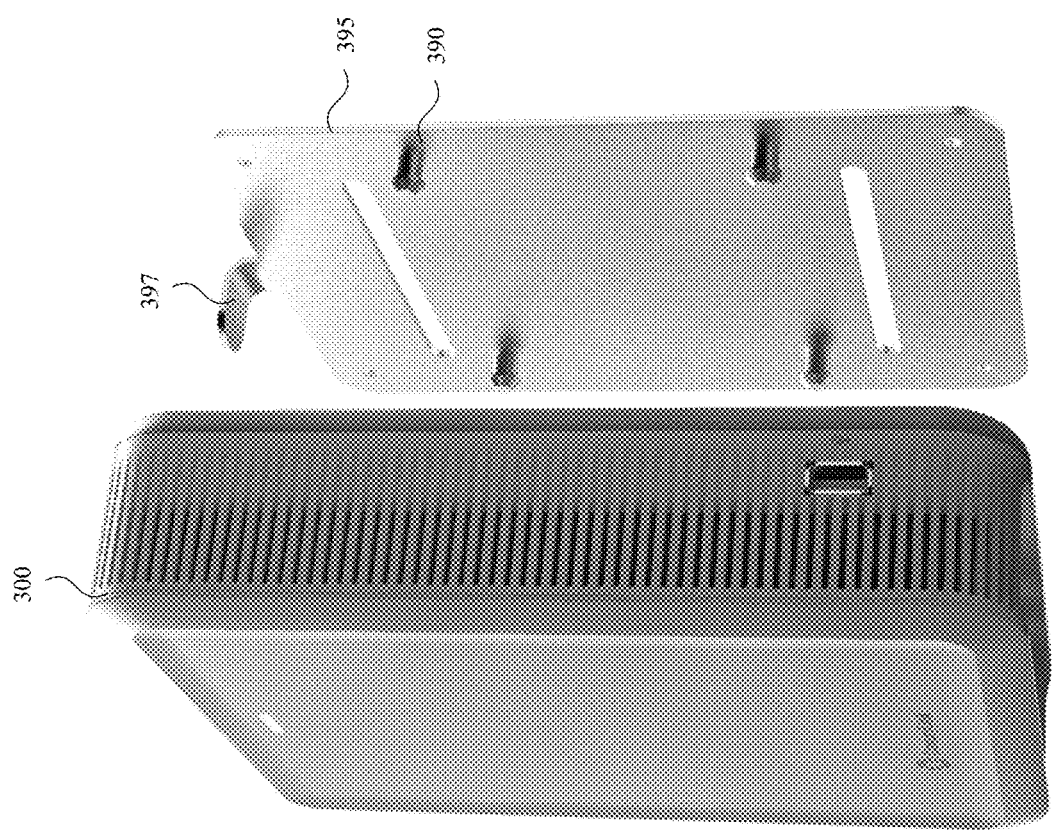
FIG. 3C illustrates the network interface device of FIG. 3A and an associated wall mount according to an example.

The network interface device 200 may include an internal power supply 210. The internal power supply 210 enables the network interface device 200 to support a two-prong power cable. An example outlet for the two-prong power cable is shown in FIG. 3A and FIG. 3B as power outlet 310. Because the power supply 210 is internal to the network interface device 200, the two-prong power cable may be connected directly from the power outlet 310 to an electrical outlet associated with an entity (e.g., entity 150 (FIG. 1)) without using a power brick. In examples, the internal power supply is operatively connected through a power-management integrated circuit 212 to a processor 214. In the example shown, the processor 214 is a system on a chip design adapted to work as a network gateway/router. Processor 214 may also be operatively connected to memory/storage 216, which may comprise random access memory (RAM), synchronous dynamic RAM (SDRAM), non-volatile (e.g. read-only memory (ROM)), flash memory, or any combination thereof, or other electronic storage capable of storing data, instructions, or other information that may be used by the processor 214 to perform one or more of the aspects of the present application.

Memory/storage 216 may also comprise, but is not limited to, an operating system, one or more program instructions, and may include sufficient computer-executable instructions, which when executed, perform functionalities as described herein. The operating system, for example, may be suitable for controlling the operation of processor 214. Furthermore, aspects may be practiced in conjunction with a graphics library, other operating systems, or any other application program and is not limited to any particular application or system. System 200 may also include additional data storage devices (removable or non-removable). Programming modules stored in memory/storage 216 may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, flash drives, or a CD-ROM, or other forms of RAM or ROM. The term computer-readable storage medium refers only to nontransitory devices and articles of manufacture that store data or computer-executable instructions readable by a computing device. The term computer-readable storage media does not include computer-readable transmission media.

Aspects of the present invention may be used in various distributed computing environments where tasks are performed by remote processing devices that are linked through a communications network. Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with system 200 or any other computing devices, in combination with system 200, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The network interface device 200 may also include a diagnostic system (shown as dying gasp circuit 220). The diagnostic system provides a message or other signal to the network service provider when the network interface device 200 loses power and/or when another potential issue is determined/detected. The message is provided to the network service provider via the network associated with the network service provider. In an example, the diagnostic system 220 may store or otherwise have access to a power source that enables the diagnostic system to generate and/or provide the message to the network service provider in the event power is lost. Further, system 200 may comprise a reset button that can be activated in order to cause the system 200 to be rebooted in case of failure or need of restart. In addition, system 200 may include indicators 225 that are activated through shift registers 229 by processor 214 to display the status of the system 200. For examples, indicators may comprise light emitting diodes that display statuses of different system elements through colors.

The network interface device 200 may also include a first communication port 230. The first communication port 230 may be used to communicatively couple the network interface device 200 to access a network provided by the network service provider. In an example, the first communication port 230 may be a DSL port, a SFP (a small form-factor pluggable) port, a cable port, a phone port and the like. An example first communication port is shown in FIG. 3A and FIG. 3B as first communication port 320.

In an example, the first communication port 230 may be configured to support different connection types. For example, if an entity (e.g., entity 150 (FIG. 1)) is located in an area in which fiber-optic cables are used to provide network access, the first communication port 230 may be a first type of communication port (e.g., a communication port that supports fiber-optic communications/signals). However, if the entity is located in an area in which copper cables are used to provide network access, the first communication port 230 may be a second type of communication port (e.g., a communication port that supports communications/signals via copper cables). In another example, the first communication port 230 may support communications/signals from fiber-optic cables and copper cables. In yet another example, the first communication port 230 may receive a transceiver that enables the transmission of data from a connected device to the network interface device 200.

The network interface device 200 may also include a second communication port 240. The second communication port may be used to communicatively couple the network interface device 200 to a network access device (e.g., network access device 140 (FIG. 1)). In the examples shown in FIG. 2-FIG. 3B, the network interface device 200 includes two communications ports (shown in FIG. 3A and FIG. 3B as LAN/WAN communication port 330 and ethernet communication port 340). In examples, communication ports 230 and 240 may be operatively connected to processor 214 through one or more switching devices 245.

The network interface device 200 may also include communication system that enables the network interface device 200 to be wirelessly coupled to one or more computing devices. The communication system is shown in FIG. 2 comprising wireless antenna 250 and wireless transceiver 255, which may comprise a Bluetooth antenna. Although Bluetooth communication is specifically mentioned, other wireless communication protocols may be used.

The communication system may be used by a customer of the network service provider to order, cancel, or change a network subscription. For example, if the customer moves into and/or lives in a house in which the network interface device 200 has already been provided, the customer need only wirelessly connect, via an application executing on her computing device, (e.g., computing device 160 (FIG. 1)) to the network interface device 200 and request the network service provider provide network access to the network interface device. Once network access has been provided to the network interface device 200, the customer may connect her own network access device (e.g., a mesh network access device) to the network interface device. Once the network access device has been coupled to the network interface device 200, she may have access to the network provided by the network service provider.

Additionally, new network access devices may be readily added to the network interface device 200 without replacing it. For example, if the customer purchases a new mesh network device (e.g., due to a new version of Wi-Fi being released), the customer need only disconnect the old mesh network device from the network interface device 200 and couple the new mesh network device to the same network interface device 200.

A customer may alter and/or cancel a subscription in a similar manner. In some examples, even if a customer moves from their home in which the network interface device 200 is provided, the network interface device 200 may stay at the home. The network interface device 200 may be subsequently used by the new resident to setup network access in the manner previously described.

In another example, the communication system may enable a computing device associated with a network technician to wirelessly communicate with the network interface device 200. The network technician may, via the wireless communication channel established between the computing device and the network interface device, run various network diagnostic tests to assist the network technician in diagnosing network connectivity issues or troubleshooting other issues. In an example, the network technician may send one or more commands to a tone generation system 260 of the network interface device 200. In response to the command, the tone generation system 260 generates a tone that travels along one or more cables and/or wiring thereby enabling the network technician to identify a particular wire/cable and/or various connectivity issues. In examples, this may be particularly useful when a technician seeks to diagnose connectivity issues without access to the interior of the building in which the network interface device is positioned (e.g., inside of a customer's home).

Although a specific example has been given, the communication system may enable the network technician to request and/or receive additional diagnostic information associated with the network interface device 200. The diagnostic information may include, but is not limited to, a firmware version, a software version, a model number, connection status, connection speeds, IP address, etc.

In an example, the network interface device 200 may be accessible via a cellular backhaul connection. For example, a technician may connect to and/or manage the network interface device via the cellular backhaul connection.

The network interface device 200 may also include a cable connection interface 270, operatively connected to processor 214. The cable connection interface may comprise, e.g., a USB 3.0 port. Although a USB port is specifically mentioned, the cable connection interface may be used to communicatively couple a remote device (e.g., a dongle, storage device, controller) to the network interface device 200. In the example shown in FIG. 2, the cable connection interface provides at least one ampere of power. Accordingly, the cable connection interface may provide power to the remote device as needed. The cable connection interface is shown in FIG. 3A as USB port 350.

The network interface device 200 may also include the various other circuits and components shown in FIG. 2, such as internal debug ports 272 and other storage, processing and communications mechanisms.

FIG. 3A illustrates an isometric view of a network interface device 300 according to an example and FIG. 3B illustrates a back view of the network interface device 300 of FIG. 3A according to an example. The network interface device 300 may be similar to the network interface device 130 (FIG. 1) and/or the network interface device 200 (FIG. 2).

As explained above, the network interface device 300 may include a power outlet 310, a first communication port 320, a LAN/WAN communication port 330 and an ethernet communication port 340. The power outlet may be a two-prong power outlet such as described above. The first communication port 320 may be a SFP port although other ports are contemplated.

The LAN/WAN communication port 330 and the ethernet communication port 340 may be used to communicatively couple the network interface device 300 to a network access device (e.g., network access device 140 (FIG. 1)).

The network interface device 300 may also include a USB port 350. The USB port 350 may output at least one ampere of power and may be used to couple a remote device to the network interface device 300. In an example, the remote device may be a network access device or other such network adapter 305 (FIG. 3E) capable of providing wireless communication abilities and/or wireless network access to the network interface device 300.

The network interface device 300 may include a housing 370 having a number of openings that provide access to the various ports and interfaces. An optical label 360 may be provided on a surface of the housing 370. When scanned by a computing device (e.g., a computing device associated with a customer and/or a network technician) the optical label 360 provides information specific to the network interface device 300 to the computing device. This information may include a model number of the network interface device 300, a firmware and/or software version of the network interface device 300, connection status information and the like. In an example, scanning of the optical label 360 may enable the computing device to initiate a communication session with the network interface device 300 over the communication channel.

Figure 3D:
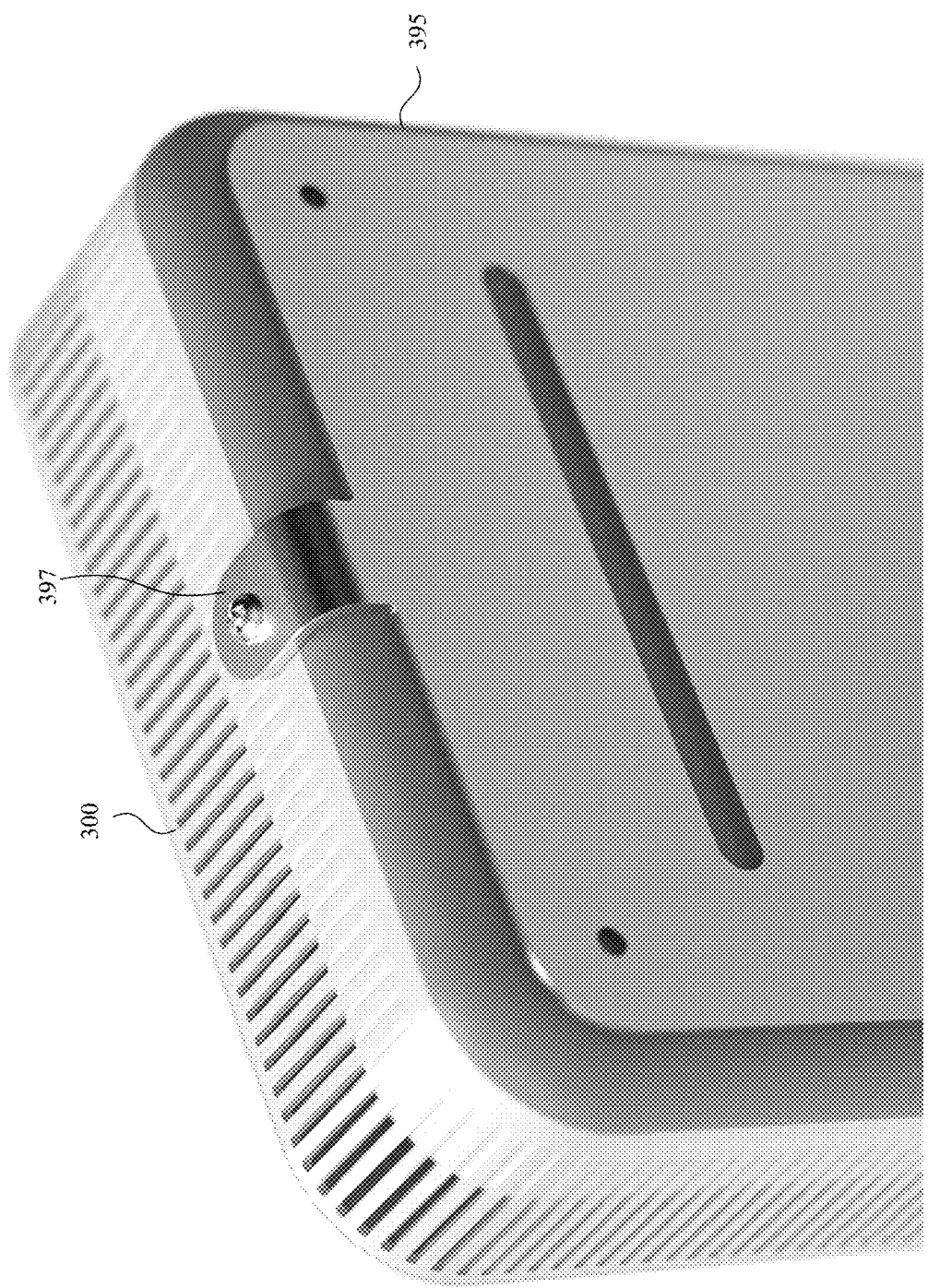
FIG. 3D illustrates the network interface device of FIG. 3C being coupled to the wall mount according to an example.
Figure 3E:
FIG. 3E illustrates the network interface device of FIG. 3A being coupled to a wireless network adapter according to an example.

The network interface device 300 may also include various keyholes 380 provided on a bottom side of the housing 370 such as shown in FIG. 3B. The keyholes 380 enable the network interface device 300 to be removably coupled to various protrusions 390 (FIG. 3C) of a wall plate 395. Once the network interface device 300 has been removably coupled to the wall plate 395, a lock screw may be inserted through a lock screw protrusion 397 to secure the network interface device 300 to the wall plate 395. FIG. 3D shows an example of the network interface device 300 being securely coupled to the wall plate 395 using the lock screw protrusion 397.

Figure 4:
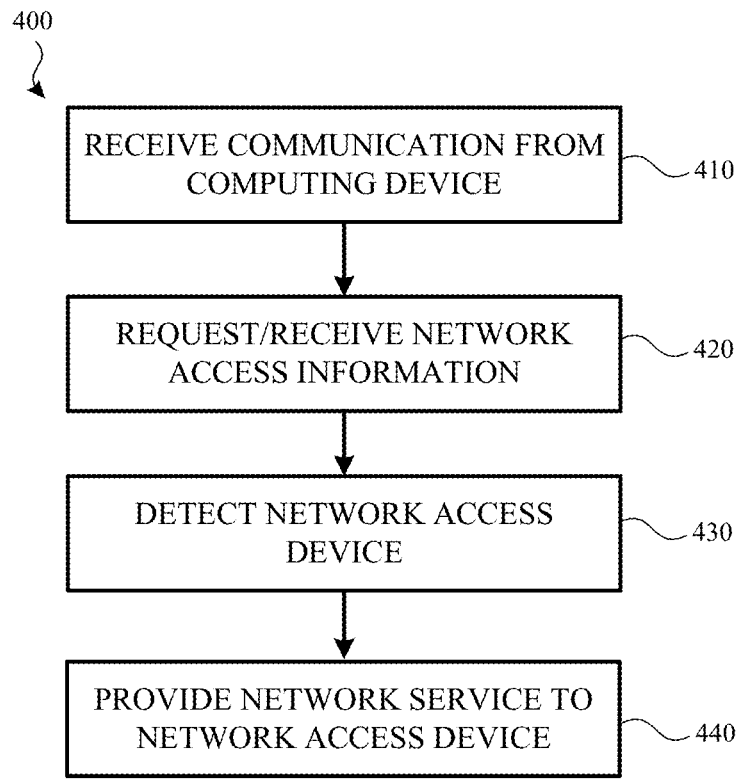
FIG. 4 illustrates a method for enabling a computing device to establish a communication session with a network interface device according to an example.

FIG. 4 illustrates a method 400 for enabling a computing device (e.g., computing device 160 (FIG. 1)) to establish a communication session with a network interface device (e.g., network interface device 130 (FIG. 1)) according to an example.

Method 400 begins when the network interface device receives (410) a communication from a computing device. In an example, the communication is received via a communication channel. The communication channel may be a Bluetooth communication channel although other communication channels are contemplated. In this particular example, the received communication may include a request to add, update or cancel a network subscription provided by a network service provider. For example, if an individual moves into a new house and the house has a network interface device such as described herein already on the premises, the individual, via her computing device, may establish a communication session with the network interface device.

Once the communication session is established, the network interface device may request and/or receive network access information associated with the individual. This information may be requested and/or received from the computing device of the individual. In another example, the information may be requested and/or received from the network service provider associated with the network interface device. In an example, the network access information may indicate whether the individual is a current customer, is upgrading her network service, downgrading her network service, is cancelling her network service and/or is requesting new network service.

When the customer is requesting new service, upgrading service or downgrading service, the network interface may detect (430) whether a network access device is connected. For example, the network interface device may detect that a mesh network device has been connected to one of its ports. When the network access device is connected, the network interface device may provide (440) network service to the network access device.

Figure 5:
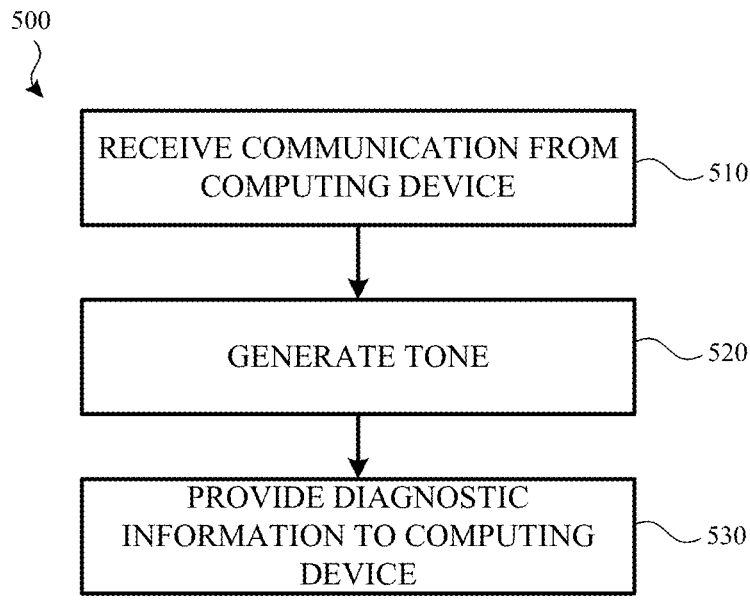
FIG. 5 illustrates another method for enabling a computing device to establish a communication session with a network interface device according to an example.

FIG. 5 illustrates another example method 500 for enabling a computing device (e.g., computing device 160 (FIG. 1)) to establish a communication session with the network interface device (e.g., network interface device 130 (FIG. 1).

Method 500 begins when the network interface device receives (510) a communication from a computing device. In an example, the communication is received via a communication channel. The communication channel may be a Bluetooth communication channel although other communication channels are contemplated. In this particular example, the received communication may include a request from a network technician. The request may include a request that the network interface device generate (520) a tone to enable the network technician to diagnose a network connectivity issue.

Once the tone is generated, the tone and/or diagnostic information associated with or otherwise diagnosed via the tone may be provided (530) to the computing device. The diagnostic information may be provided over the communication channel.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A network interface device, comprising:
    a first port for connecting the network interface device to a network access point provided by a network service provider;
    a second port for connecting the network interface device to a separate network access device;
    a wireless communication system using memory storage and one or more processing units of the network interface device for communicatively coupling the network interface device to a remote computing device to enable one or more of:
        access to a subscription service associated with the network service provider; or
        access to diagnostic information associated with the network interface device; and
    a tone generation system using memory storage and one or more processing units of the network interface device for generating a tone for providing additional diagnostic information associated with the network interface device, the tone being generated in response to instructions received via the wireless communication system.

2. The network interface device of claim 1, further comprising an internal power supply.

3. The network interface device of claim 1, wherein the first port is configured for receiving the access via a copper cable.

4. The network interface device of claim 1, wherein the first port is configured for receiving the access via a fiber optic cable.

5. The network interface device of claim 1, further comprising a cable connection interface for communicatively coupling a remote device to the network interface device.

6. The network interface device of claim 5, wherein the cable connection interface provides at least one ampere of power to the remote device.

7. The network interface device of claim 1, further comprising a diagnostic system that automatically transmits diagnostic information to the network service provider when a potential issue is detected.

8. The network interface device of claim 1, further comprising an optical label on an outer surface of a housing of the network interface device.

9. The network interface device of claim 8, wherein the optical label provides network-interface-device-specific information to a computing device that scans the optical label.

* * * * *